3 Sheets--Sheet 1.

S. GESLEY.

Improvement in Corn-Harvesters.

No. 130,211. Patented Aug. 6, 1872.

WITNESSES.
J. West Wagner
H. M. Phillips.

Inventor.
Saber Gesley
by Johnson Klaucke & Co
his Attorneys

S. GESLEY.

Improvement in Corn-Harvesters.

No. 130,211.  Patented Aug. 6, 1872.

3 Sheets--Sheet 2.

WITNESSES.
J. West Wagner
H. M. Phillips

Inventor.
Saber Gesley
by Johnson Klaucke & Co
his Attorneys.

3 Sheets--Sheet 3.

S. GESLEY.

Improvement in Corn-Harvesters.

No. 130,211. Patented Aug. 6, 1872.

WITNESSES.
Jms H Wagner.
H. M. Phillips.

Inventor.
Saber Gesley
by Johnson Klaucke & Co.
his Attorneys.

UNITED STATES PATENT OFFICE.

SABER GESLEY, OF BELOIT, WISCONSIN.

IMPROVEMENT IN CORN-HARVESTERS.

Specification forming part of Letters Patent No. 130,211, dated August 6, 1872.

*To all whom it may concern:*

Be it known that I, SABER GESLEY, of Beloit, in the county of Rock and State of Wisconsin, have invented a new and useful Improvement in Corn Harvesters and Huskers, of which the following is a specification:

My invention relates to that class of corn-harvesters in which the stalks, when cut, are carried between rollers to separate the ears from the stalks automatically; and my said invention consists, first, in combining with such corn-harvesting machine suitably-arranged rollers for the purpose of husking the ears of corn after they have been separated from the stalks, and of delivering the ears after being husked into a suitably-arranged receptacle; also, in the construction and combination of the adjustable reel and adjustable reel-guide, so as to enable the same to be raised or lowered on its standard in order to make the arms strike the stalks of the corn nearer to or further away from the cutting-knives to maintain the same angles of the said pivoted reel-arms with respect to the cutting apparatus, or to change them, if desired; also, in peculiar combinations of endless belts so arranged as to deliver the corn from the point where it is cut to the point where it is dropped, in a husked condition, into the proper receptacle, automatically; and, lastly, in the combination and arrangement of the several parts relatively to each other.

Figure 1:
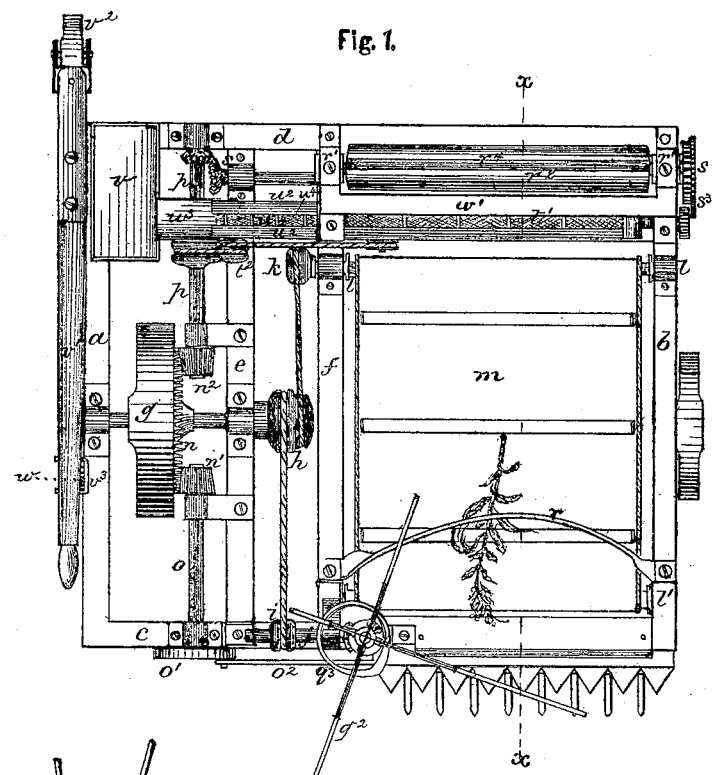
Figure 2:
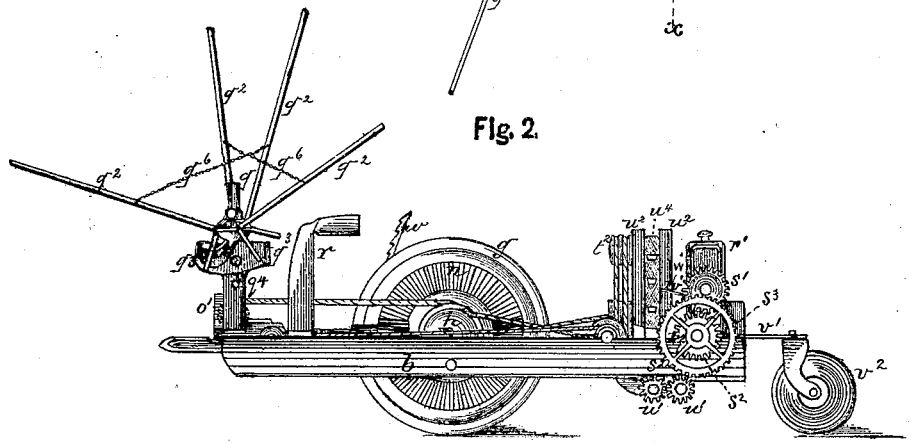
Figure 3:
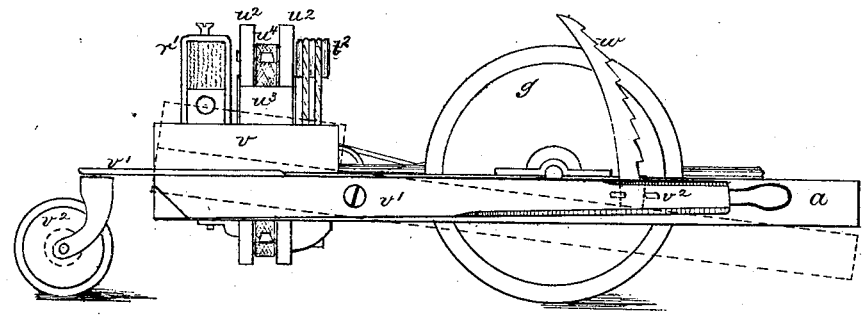
Figure 4:
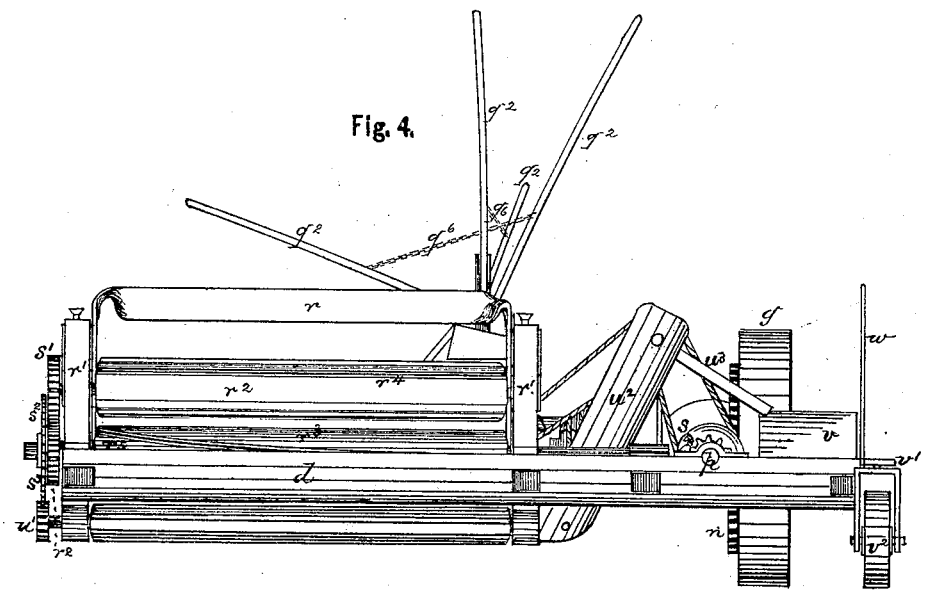
Figure 5:
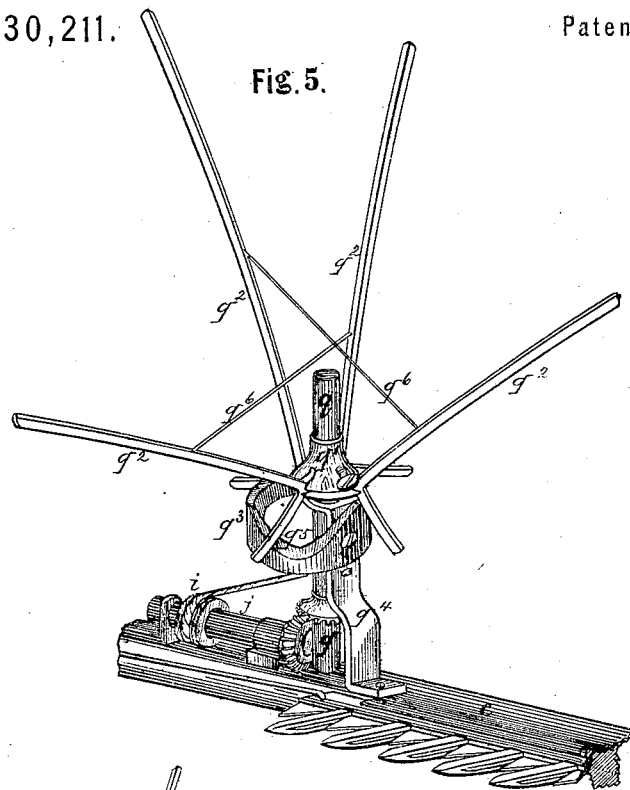
Figure 6:
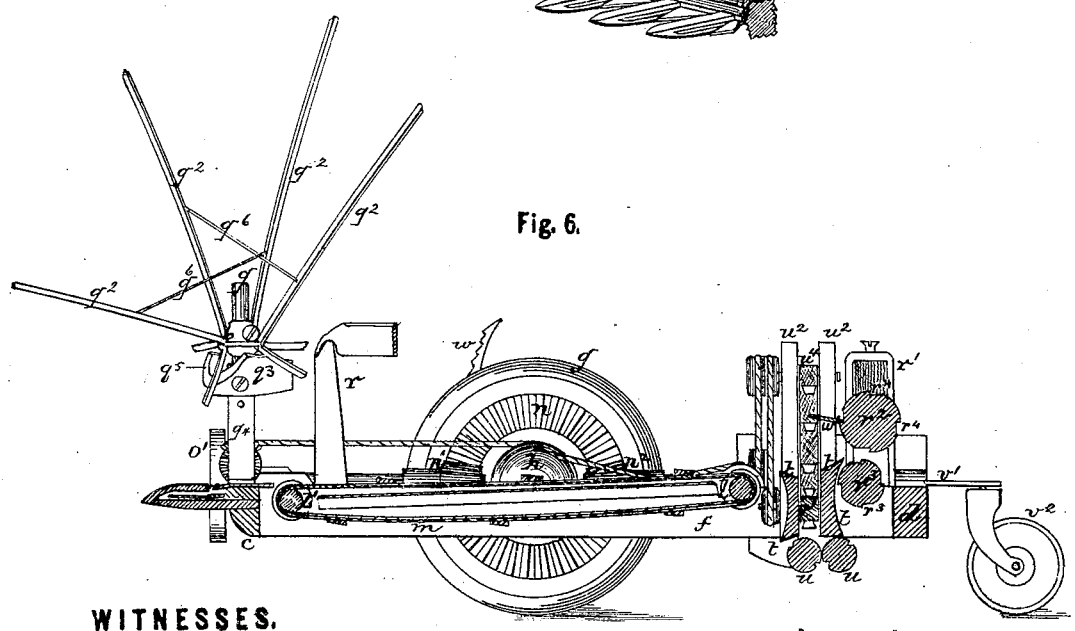

In the accompanying drawing, Figure 1 represents a top or plan view of my improved machine. Fig. 2 represents a side elevation of the same. Fig. 3 represents a similar elevation of the opposite side. Fig. 4 represents a rear view of the same. Fig. 5 represents a detached perspective view of the reel, and Fig. 6 represents a longitudinal vertical section in line $x\ x$ of Fig. 1.

The frame of my improved corn harvesting and husking machine consists of the side beams $a\ b$, front and rear beams $c\ d$, and cross-beams $e\ f$, the two latter being parallel with the side beams. Between the side beam $a$ and the cross-beam $e$ the main driving-wheel $g$ is placed, its shaft revolving in suitable bearings on the beams $a\ e$, and carrying on the outside of beam $e$, between the latter and the cross-beam $f$, a double pulley, $h$, the inner groove of which operates, by means of a belt and a small pulley, $i$, the shaft $j$, from which the reel is rotated, while the outer groove connects, by a belt, with a small pulley, $k$, on the rear shaft $l$ of the endless apron $m$, and thus operates the latter, which is stretched over the front and rear shafts $l'\ l$, suitably journaled in the frame. The inner face of the main wheel $g$ is provided with cog-teeth $n$, gearing on either side with small bevel-gear wheels $n^1$ and $n^2$, the former of which is secured on the end of a shaft, $o$, rotating in suitable bearings, one on the beams $c$, and the other extending from beam $e$ and carrying a disk, $o^1$, on which one end of the knife-bar $o^2$ is eccentrically pivoted, while the pinion $n^2$ is secured to the end of a shaft, $p$, extending in the opposite direction, and likewise revolving in suitable bearings. The reel is operated, as above stated, from the shaft $j$, and it is arranged at the inner end of the knife, and operates in such a manner as to bring and hold the stalks to the knives and to throw them on the endless apron $m$. The reel consists of the shaft $q$, on which a sleeve, $q^1$, is secured by a set-screw. In suitable slots formed in the periphery of the sleeve are pivoted bell-crank (lever-shaped) reel-arms $q^2$ in such a manner that their shorter downwardly-extending portions are supported by the upper rim of a circular flange or ring, $q^3$, secured by a set-screw to a standard, $q^4$, and vertically adjustable on the same. The ring $q^3$ has a portion cut away, as shown at $q^5$.

It will be easily understood that, as the shaft $q$, with its arms, is revolved, the longer portion of the arms $q^2$ will be kept in an elevated position, except when their shorter portions pass over the cut-out portion $q^5$ of the ring, in passing over which the shorter portions will be brought into a more vertical position, thereby lowering their upper longer portion toward the knife-bar; and as the cut-away portion of the ring is so arranged relatively to the knife-bar that the upper portions of the arms $q^2$ are nearly parallel with it just as they pass over it, it will be easily seen that in this manner they force the stalks against the knives. In order to adjust the degree to which these reel-arms are to be lowered, the sleeve $q^1$ may be adjusted on its shaft $q$, or the ring $q^3$ on its standard $q^4$, which latter also forms the upper bearing of the shaft $q$. Each two opposite arms, $q^2$, are connected to each other by cords $q^6$.

From this construction it will be seen that the sleeve $q^1$ of the pivoted reel-arms can be adjusted upon the shaft $q$, and the guide-ring $q^3$ upon the standard $q^4$, in order that when the guide-ring is raised or lowered to bring the reel-arms nearer to or further from the cutter, the reel-sleeve may be correspondingly adjusted upon its shaft to maintain the same angle of the pivoted reel-arms with the cutter, and in this way keep the pivoted arms in a horizontal position while passing over the cutter, or to change their angle therewith, if desired. A fender, $r$, consisting of two standards secured on the beams $f$ and $b$, respectively, and the upper ends of which are connected by a curved top piece, is so arranged on the frame relatively to the reel and the knives as to cause the upper ends of the stalks after they are cut to lean against this fender, while the endless apron $m$ carries their lower ends to the rear, and thus force the stalks to fall on the endless apron and be fed to the separating-rollers butt-end foremost. From the rear ends of the beams $b$ and $f$, respectively, rise two standards, $r^1$, in which the upper separating-roller $r^2$ has its adjustable bearings, while the shaft of the lower roller $r^3$ has its fixed bearings in the beams $b$ $f$ $e$, the shaft extending to beyond the latter beam, and carrying at its end a beveled cog-wheel, $s$, gearing with a similar cog-wheel on shaft $p$, which is revolved directly from the main driving-wheel, as already described. On the outside of the standard $r^1$, rising from the beam $b$, the shaft of the upper roller $r^2$ carries a gear-wheel, $s^1$, gearing with a similar wheel, $s^2$, on the corresponding end of the shaft of the lower roller $r^3$, and on which end, outside of the gear-wheel $s^2$, a larger gear-wheel, $s^3$, is keyed or otherwise secured. The upper roller $r^2$ is provided with longitudinal straight grooves $r^4$, while the lower roller $r^3$ has longitudinal spiral grooves $r^5$. By this arrangement the stalks will be seized between the rollers and the ears forced butt-end against them in whatever position the stalks may reach the rollers, for the spiral and the straight grooves will always bring the stalk at a right angle to the rollers, or nearly so, by means of the straight grooves of the upper roller, which tend to hold the stalks in their direct path from the apron $m$, and to draw them through without turning them out of their course. Between the lower roller $r^3$ and the rear end of the endless apron $m$ two pieces, $t$, form a box, in which an endless belt, $t^1$, revolves around suitable shaft in each end of the box, motion being imparted to the shaft at the inner end by a belt-pulley and belt from a double-grooved pulley, $t^2$, which receives its motion from a pulley on the shaft $p$. Under the endless belt $t^1$ are arranged, side by side, two rollers, $u$, of a smaller diameter than the rollers $r^2$ and $r^3$, their shafts revolving in suitable bearings hung from the under side of beams $b$ and $f$, and receiving their motion from the gear-wheel $s^3$, gearing with one of the toothed wheels $u^1$, of which each shaft carries one at its outer end, and which gear with each other. These rollers $u$ are arranged so near to each other as to allow the husks to pass off between them, but too near to allow an ear of corn to pass. From near the inner end of these rollers $u$ two pieces, $u^2$, extend upwardly at an angle, between which an endless belt, $u^4$, revolves, which conveys the husked ears of corn from the parallel husking-rollers through an inclined chute, $u^3$, into a receptacle, $v$, which is arranged on the frame in a suitable position to be removed from time to time when full, and replaced by an empty one. This receptacle $v$ is made to hold a given quantity of husked ears of corn, and therefore measures the corn that has been husked. It may be removed when full and replaced by an empty one by an attendant, or may be so arranged as to automatically discharge its contents, when filled to a certain point, into a low wagon arranged under it for that purpose, and may register automatically the number of discharges. On the outside of the beam $a$ is pivoted a lever, $v^1$, the point of its pivot being near the rear end of the frame. This lever $v^1$ extends rearwardly beyond the frame, and carries at that end a wheel, $v^2$, arranged to turn on a pivot in the end of the lever, like a caster-wheel. The front end of the lever is formed into a handle, by which to operate it, and is, on its inner face and at a short distance from that end, provided with a metal loop, $v^3$, which, passing over a curved rack, $w$, may engage with any of the teeth of said rack, so as to hold the front end of the lever in a more or less elevated or depressed position.

The operation of my corn harvester and husker is as follows: The machine is drawn by draft-animals in the usual manner, and the cutting-knife bar operated automatically as it advances, thereby cutting the stalks nearer to or further away from the ground, as may be desired. This change in the line of cut is effected by means of the lever $v^1$, which either elevates or depresses the rear of the frame and thereby depresses or elevates its front, respectively. The arms of the rotating reel strike the stalks near their upper ends, and press them against the cutter and hold them while being cut, and have also a tendency to throw the stalks onto the endless apron $m$. The upper ends of the stalks, however, strike against and are held by the fender $r$, while their lower ends are being carried toward the rear by the endless apron. In this manner the stalks are thrown on the apron with their lower ends, and consequently, also, the butt-ends of the ears of corn foremost. As the stalks thus pass between the separating-rollers $r^2$ and $r^3$ the butt-ends of the ears of corn are forced from the stalks, and as the horizontal fender $w'$ prevents their being thrown upwardly they fall into the box $t$ onto the endless belt $t^1$, by means of which they are carried to the outer or right end of the same, and, this being at a little distance from the beam $b$, they fall over into the smaller husking-rollers $u$. These rollers, rotating rapidly, seize the husks of the ear of corn, and as the ear itself cannot pass between them the husks in being forced between the rollers are stripped from the corn, and the clean husked ear is pushed along by the next comer, and so on until it reaches the inner end of the rollers, where, striking on the endless belt $u^4$, it is carried up by the same and dropped through the chute $u^3$ into the receptacle $v$. When this receptacle is full it may be taken away and an empty one placed instead, and so on until all the corn is cut, separated from the stalk, and husked, and the number of bushels husked may be accurately known by the number of times the measuring receptacle $v$ has been filled and emptied. In this manner my improved machine, being moved over a field of corn, automatically delivers the cleaned and husked ears without any more manual assistance than the removal of the full receptacle $v$ and the replacement therefor of an empty one, and the exact quantity of corn cut and husked may be instantly known.

Having described my invention, I claim—

1. In a corn harvesting and husking machine, the separating-rollers $r^2$ and $r^3$ and the husking-rollers $u\ u$, arranged and operating as described, in combination with the cutting apparatus and delivering-apron $m$, arranged substantially as described.

2. In combination with the husking-rollers $u$, arranged as described, I claim the endless belt $t^1$ in the box $t$, by means of which the ears are conveyed to the husking-rollers, essentially as described.

3. In combination with the rollers $r^2\ r^3$ and the endless belt $t^1$, I claim the horizontal flat fender $w'$, arranged and operating essentially as and for the purpose described.

4. In combination with the husking-rollers $u$, I claim the endless belt $u^4$, chute $u^3$, and receptacle $v$, all arranged to operate essentially as and for the purpose set forth.

5. I claim the adjustable sleeve $q^1$ and adjustable ring $q^3$, in combination with the bell-crank shaped reel-arms $q^2$ for the adjustment of the said arms with respect to the cutter, essentially as described.

6. The combination of the cutting device, reel, endless apron $m$, fender $r$, separating-rollers $r^2\ r^3$, fender $w'$, endless belt $t^1$, husking-rollers $u$, endless belt $u^4$, chute $u^3$, and receptacle $v$, all arranged to operate essentially as herein described.

SABER GESLEY.

Witnesses:
G. H. STOCKING.
R. TATTERSHALL.